(12) United States Patent
Tracey

(10) Patent No.: US 6,400,121 B1
(45) Date of Patent: Jun. 4, 2002

(54) STARTER PACK

(76) Inventor: James Tracey, Cullen Lower, Three Mile Water, County Wicklow (IE)

( * ) Notice: Subject to any disclaimer, the term of this patent is extended or adjusted under 35 U.S.C. 154(b) by 0 days.

(21) Appl. No.: 09/885,165

(22) Filed: Jun. 21, 2001

(30) Foreign Application Priority Data

Jun. 21, 2000 (IE) .......................................... S2000/0503

(51) Int. Cl.7 ................................................. H02J 7/00
(52) U.S. Cl. ...................................... 320/104; 307/150
(58) Field of Search ................................ 320/103, 104, 320/105; 307/66, 150

(56) References Cited

U.S. PATENT DOCUMENTS 5,083,076 A * 1/1992 Scott ........................... 320/105
5,982,138 A * 11/1999 Krieger ....................... 320/104

* cited by examiner

Primary Examiner—Gregory Toatley
(74) Attorney, Agent, or Firm—Jacobson Holman, PLLC

(57) ABSTRACT

A battery starter pack comprises a housing having a base 2, a top 3, a rear 4, a front panel 5 and a pair of sides 6, 7. The sides 6, 7 extend forwardly and rearedly proud of the rear 4 and front 5 to define an area which protects various switches 25, 26, 27, 28 if the pack is toppled over. The starter pack incorporates a switching system to avoid accidental switching of the unit into a 24 volt setting while it is connected to equipment which is not designed to take a 24 volt charging supply.

24 Claims, 9 Drawing Sheets

STARTER PACK

INTRODUCTION

The invention relates to a portable engine starter pack which is used for over-riding malfunctioning or discharged batteries to start engines or the like.

One of the problems with conventional starter packs of this type is that they are relatively easily damaged, particularly as they are often roughly handled. Another problem is that such starter packs are often either very basic with minimum functions or highly complex requiring considerable operator experience.

There is a need for an improved starter pack which will overcome at least some of these difficulties.

STATEMENTS OF INVENTION

According to the invention there is provided a portable engine starter pack comprising a housing having a base, a top, a rear wall, a front wall and a pair of sides;

a battery located in the housing, the battery having a positive terminal and a negative terminal;

a socket extending from the housing, the socket having a positive socket portion connected to the positive terminal of the battery, and a negative socket portion connected to the negative terminal of the battery;

switch and/or indicating means extending from the front panel or the rear panel;

the housing having forwardly and/or rearwardly extending projections which extend proud of the panel carrying the switch and/or the indicating means to substantially protect the switch and/or the indicting means against damage if the housing is tipped into a position in which the panel carrying the switch and/or the indicating means is lowermost.

In a preferred embodiment the sides are extended to define the forward and/or rearward projections.

Preferably the housing includes an integral top handle.

In one embodiment the switch is a switch for switching between different supply voltages.

In a preferred embodiment of the invention the starter pack comprises means for inhibiting connection to an incorrect voltage supply. Preferably the inhibiting means comprises the switch.

In one embodiment the switch has an operating handle which is movable between an off position and at least two different supply voltage positions.

Most preferably the operating handle requires different movements in configurations for different voltage settings. For example, the operating handle may require at least a two step movement to move to one of the supply voltage settings. In one case a push or pull movement is followed by a rotational movement.

Preferably the indicating means is a battery condition indicator.

In one embodiment the starter pack includes a charging socket for charging the battery in the housing.

In one embodiment of the invention the starter pack includes a warning indicator for indicating if a user has incorrectly connected to a battery to be charged. The indicator may be a visual and/or an audible alarm.

According to another aspect the invention provides a portable engine starter pack comprising a housing having a base, a top, a rear wall, a front wall and a pair of sides;

a battery located in the housing, the battery having a positive terminal and a negative terminal;

a socket having a positive socket portion connected to the positive terminal of the battery, and a negative socket portion connected to the negative terminal of the battery;

the pack having at least two different supply voltages;

a switch for switching between the supply voltages; and means for inhibiting connection to an incorrect voltage.

In this case preferably the means for inhibiting connection to an incorrect voltage comprises the switch.

Preferably the switch has an operating handle which is movable between an off position and at least two different supply voltage positions. Ideally the operating handle requires different movements in configurations for different voltage settings. In one case the operating handle requires at least a two step movement to move to one of the supply voltage settings. A push or pull movement may be followed by a rotational movement.

In one embodiment the indicating means is a battery condition indicator.

Preferably the pack includes a charging socket for charging the battery in the housing.

In a preferred embodiment the pack comprises a warning indicator for indicating if a user has incorrectly connected to a battery to be charged. The indicator is a visual and/or an audible alarm.

BRIEF DESCRIPTION OF THE DRAWINGS

The invention will be more clearly understood from the following description thereof given by way of example only in which.

DETAILED DESCRIPTION

Figure 1:
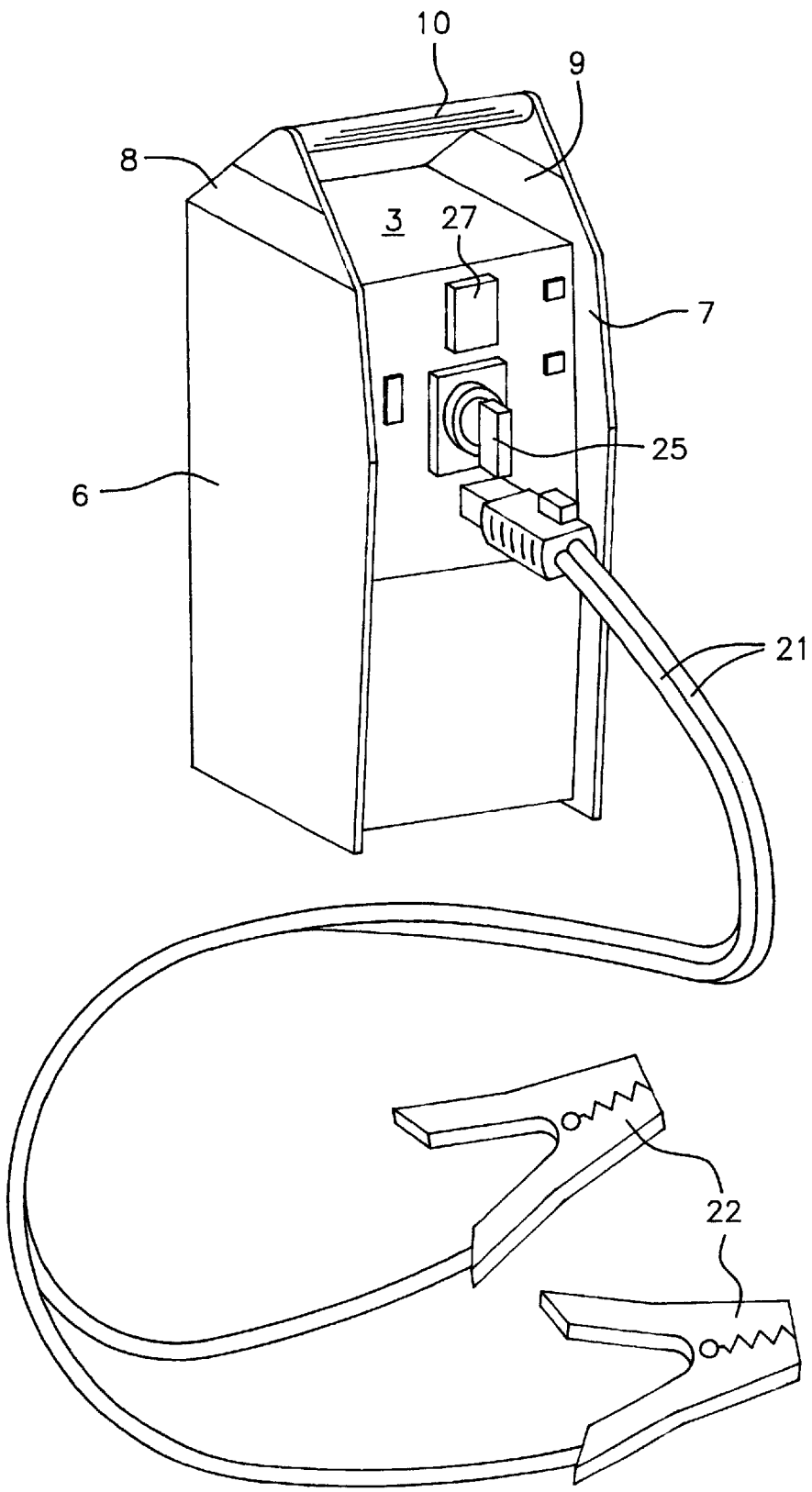
FIG. 1 is a perspective view of a starter pack according to the invention with a cable connected.
Figure 2:
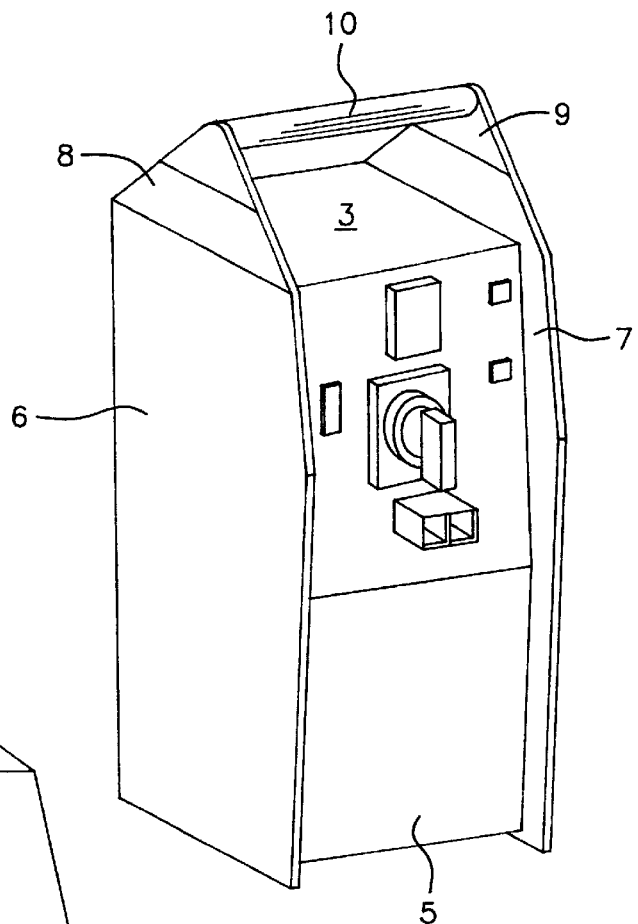
FIG. 2 is a perspective view of the starter pack.
Figure 3:
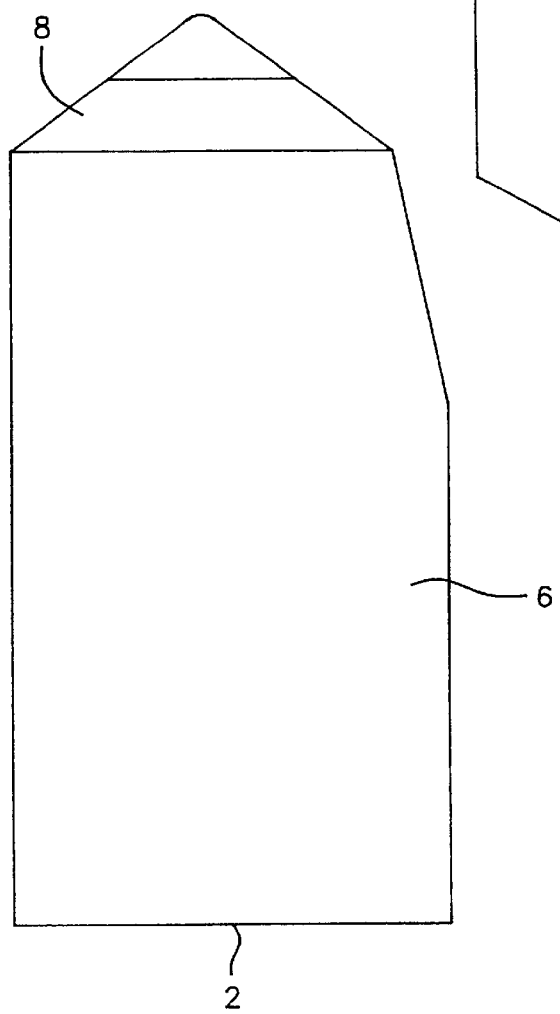
FIG. 3 is a side elevational view of the starter pack.
Figure 4:
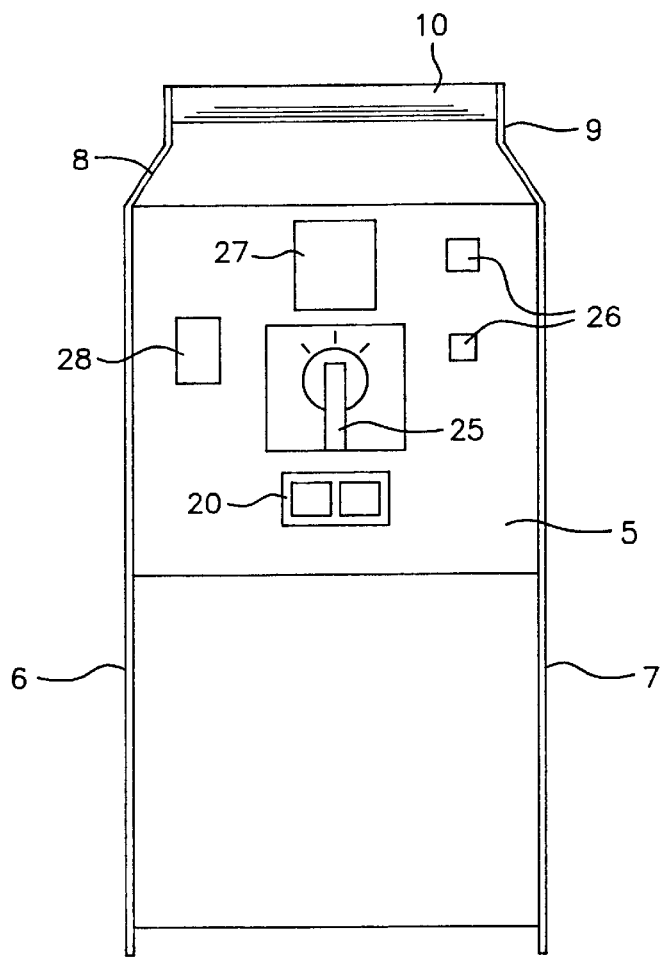
FIG. 4 is a front view of the starter pack.
Figure 5:
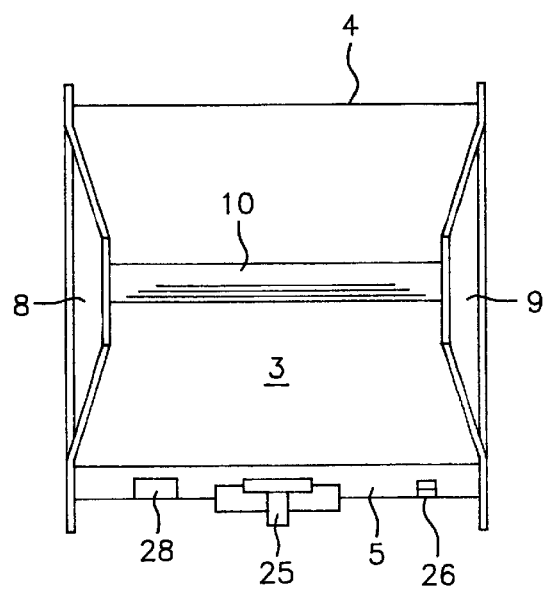
FIG. 5 is a top plan view of the starter pack.
Figure 6:
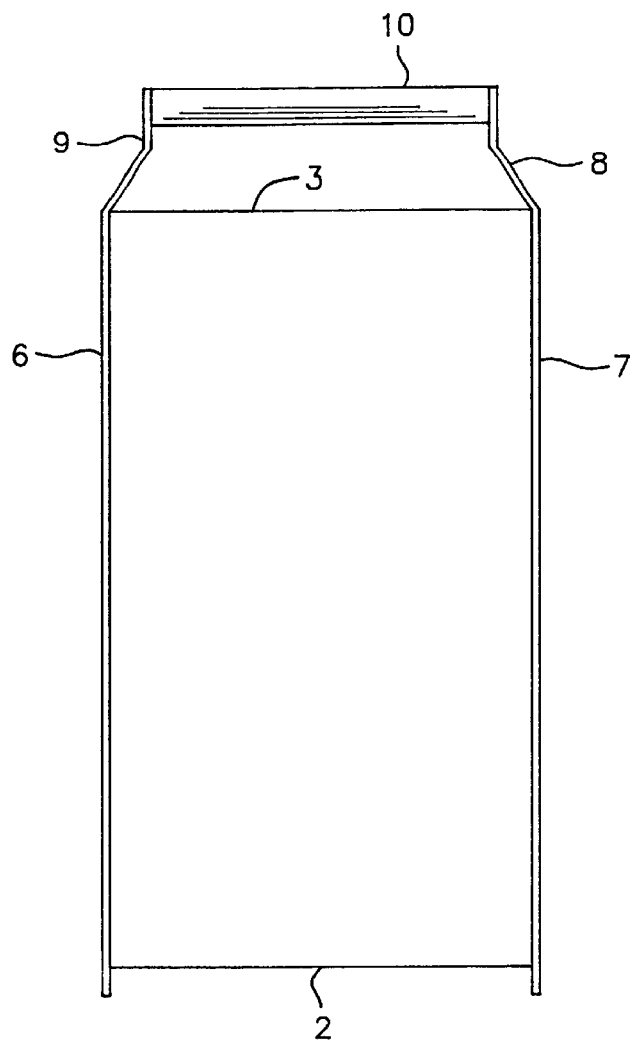
FIG. 6 is a rear view of the starter pack.
Figure 7:
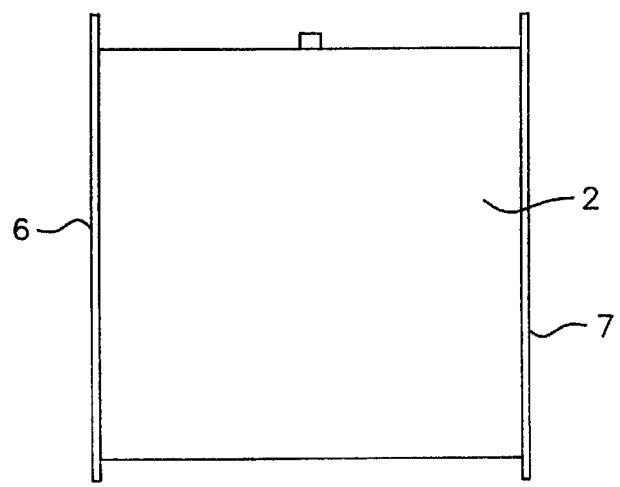
FIG. 7 is an underneath plan view of the starter pack.

Referring to the drawings and initially to FIGS. 1 to 8 there is illustrated a portable engine starter pack according to the invention. The starter pack has a metallic housing comprising a base 2, a top 3, a rear 4, a front panel 5 and a pair of sides 6, 7. The sides 6, 7 extend upwardly above the top 3 to define brackets 8, 9 between which a carrying handle 10 is mounted.

A battery (not shown) having a positive and a negative terminal is located in the housing. A socket 20 extends from the housing for connection to leads 21 with crocodile clips 22 for connection to the terminals of a battery. The socket 20 has a positive socket portion connected to the positive terminal of the battery in the housing and a negative socket portion connected to the negative terminal of the battery. In this case there are two batteries located in the housing and a manual rotary switch 25 is mounted on the front panel 5 for movement between an off position and two different voltage supply positions such as 12 volt and 24 volt supply. The front panel 5 also has test buttons 26 and a battery condition indicator 27. In this case the front panel 5 also carries a re-charging socket 28 for connection to a mains supply after the starter pack has been used.

Figure 8:
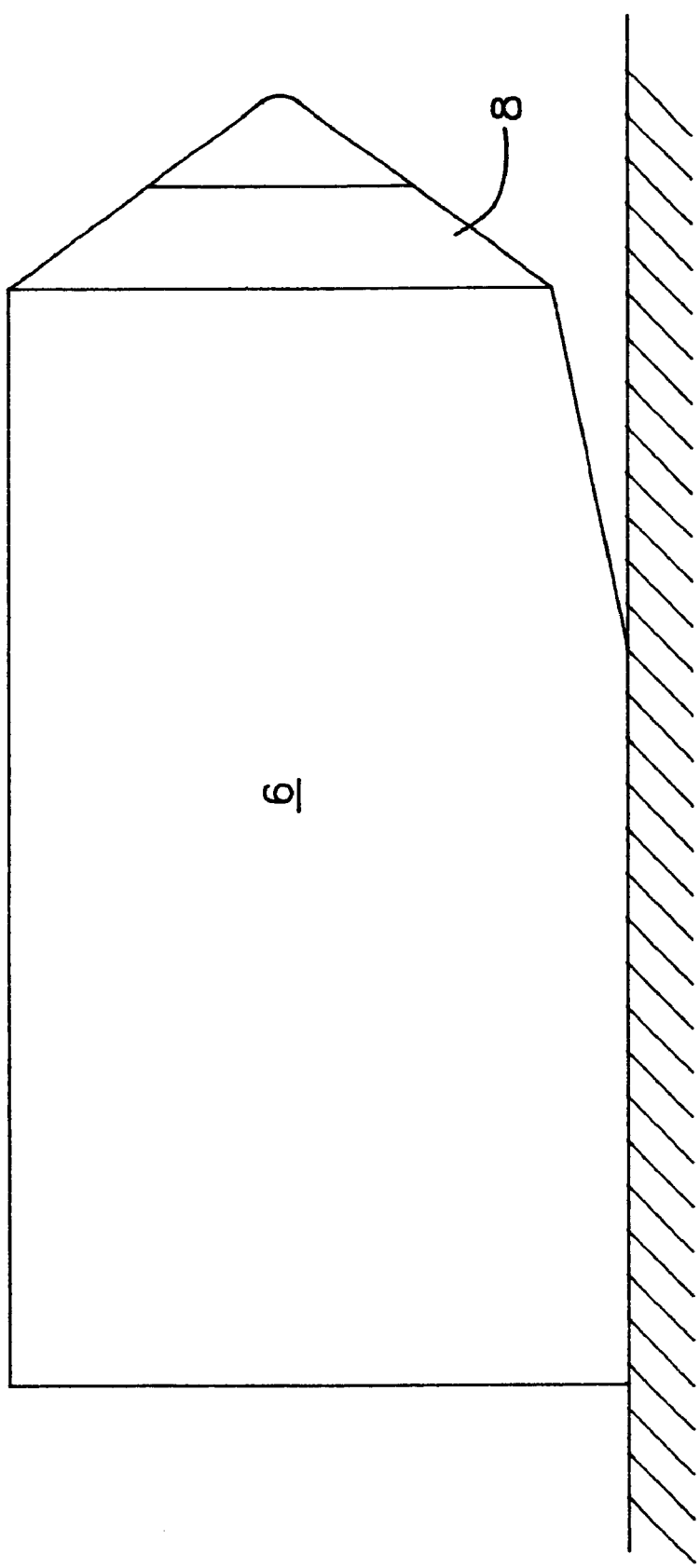
FIG. 8 is a side view of the starter pack tipped over.
Figure 9:
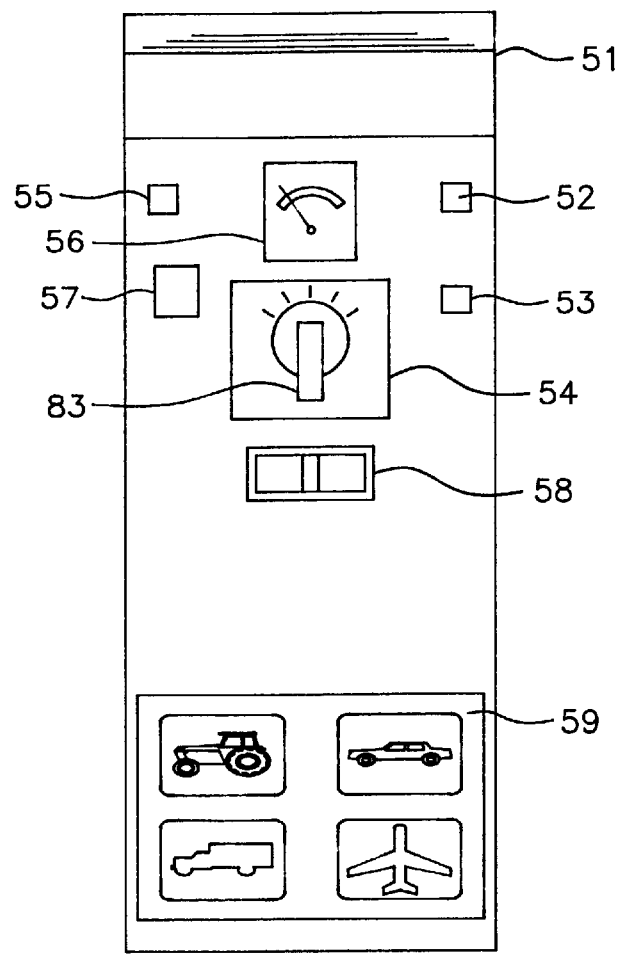
FIG. 9 is a front view of another starter pack housing according to the invention.
Figure 12:
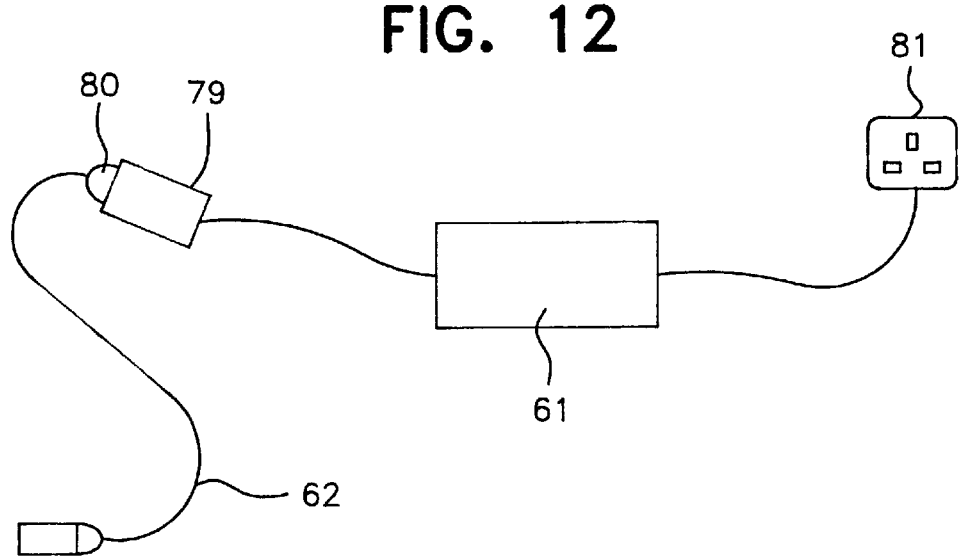
FIG. 12 is a schematic view of a charger system for use with the starter pack.
Figure 10:
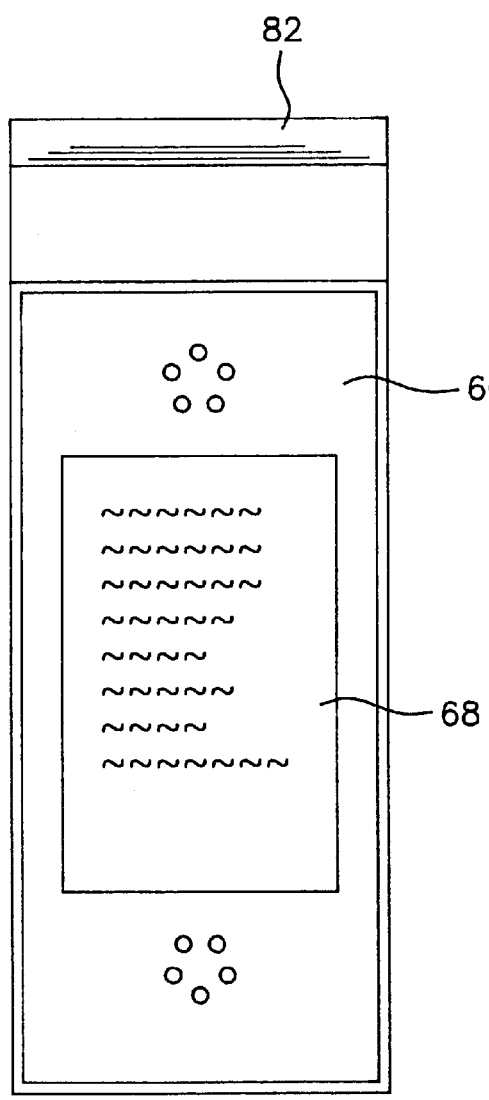
FIG. 10 is a rear view of the housing of FIG. 9.

The sides 6, 7 extend below the level of the base 2 to define support feet 12. The sides 6, 7 also extend both forwardly and rearwardly proud of the panels of the front 5 and the rear 4 of the housing to define an area which substantially protects the various switches and indicators 25, 26, 27, 28 carried by the first panel 5 if the pack is toppled over with the front panel 5 lowermost as illustrated in FIG. 8. In this way the sensitive switches etc are protected against damage and an extremely robust starter pack is thereby provided.

It will also be noted that the front panel 5 is recessed and angled rearwardly to allow easy viewing and operation of the unit.

The starter pack includes two thermal trip fuses to protect the internal wiring from damage should the rotary switch 25 be turned to the incorrect voltage position. The unit also includes visual and/or audible alerting means in the form of an alarm buzzer if a user incorrectly connects the crocodile clips 22.

Figure 11:
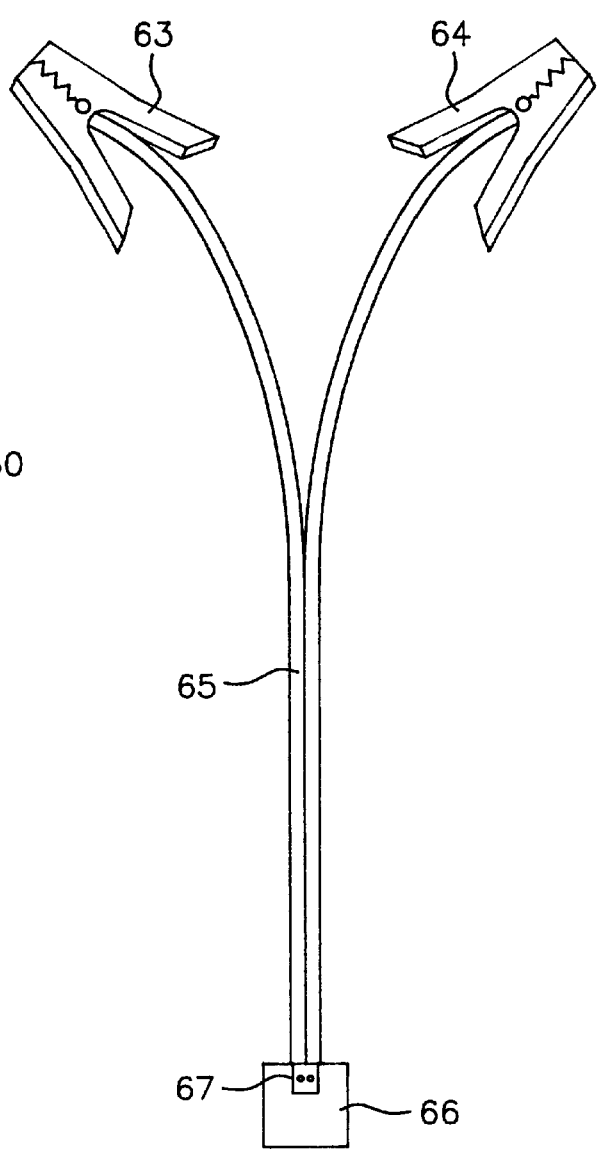
FIG. 11 is a schematic view of a user battery connection system for use with the starter pack.
Figure 13:
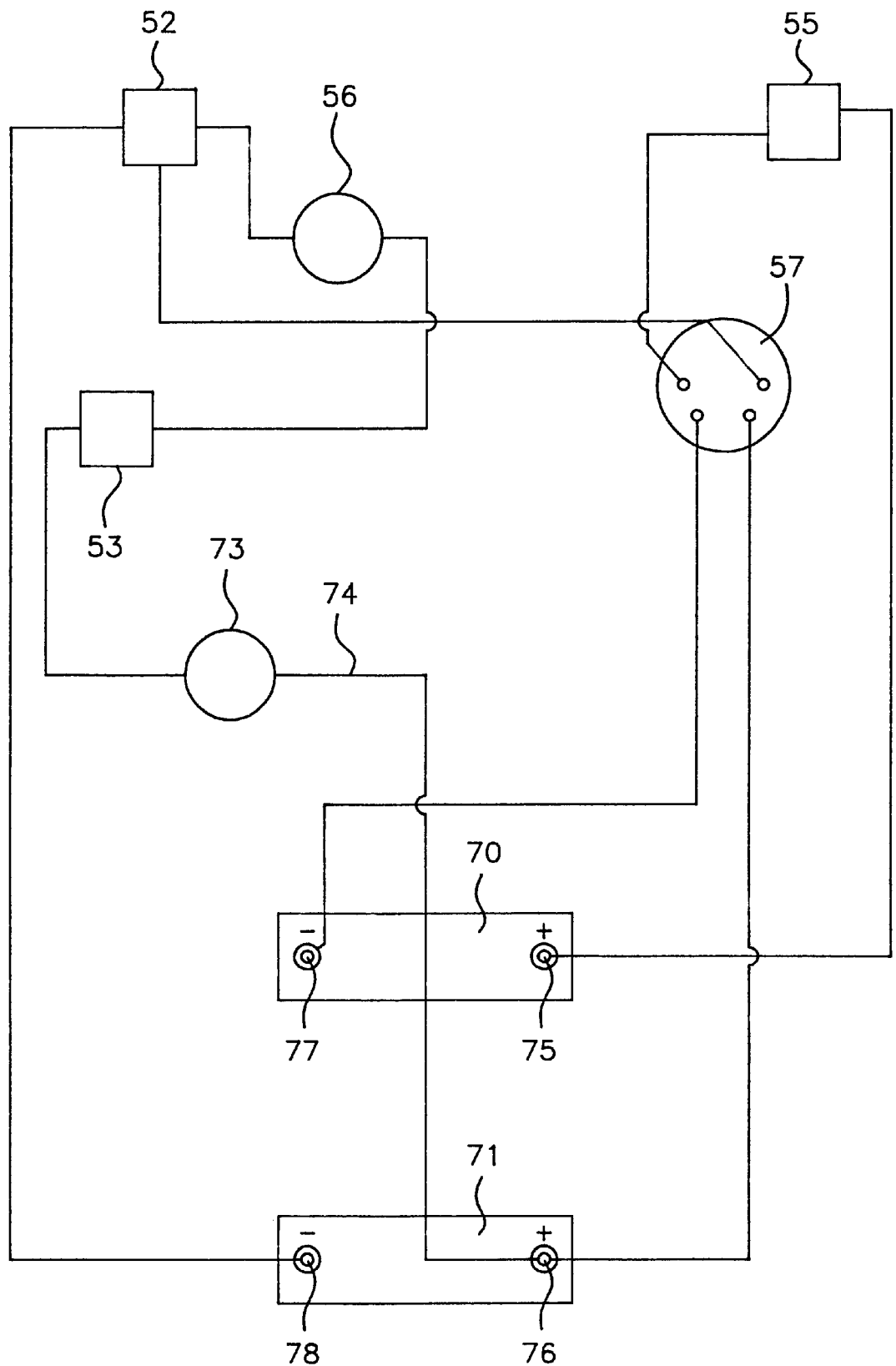
FIG. 13 is a wiring diagram of the starter pack.
Figure 14:
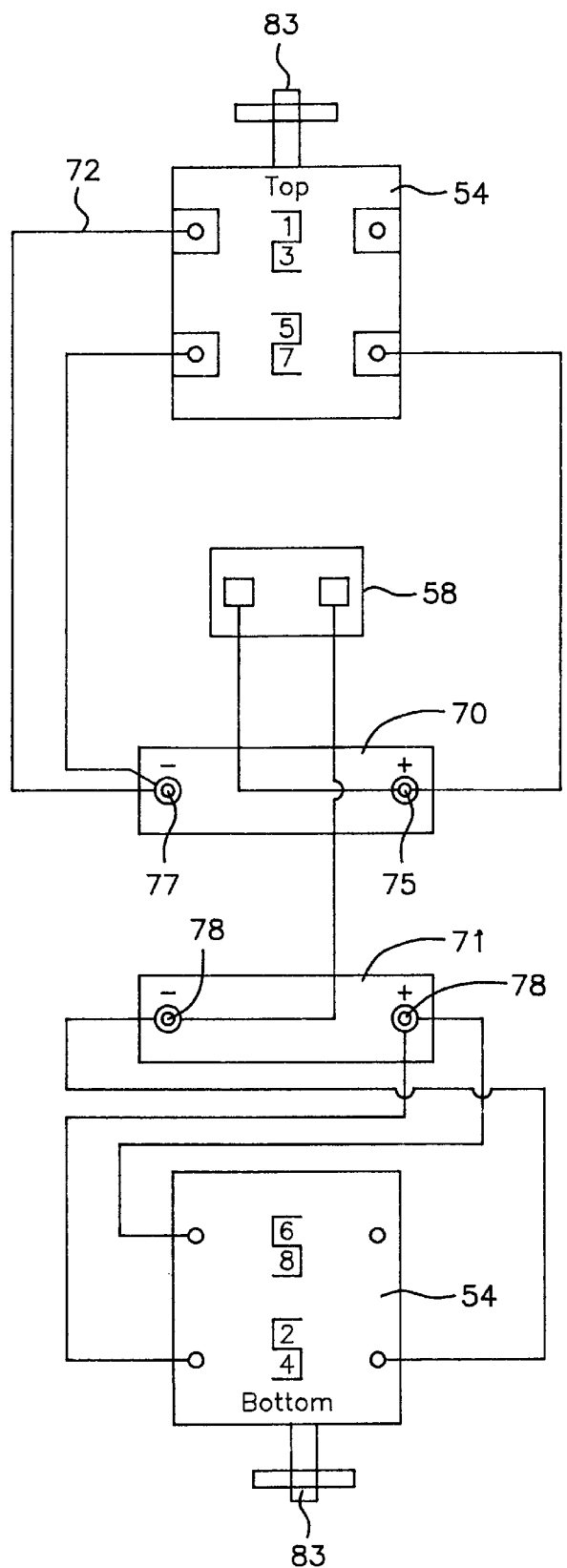
FIG. 14 is a wiring diagram of a switching system used in the starter pack of the invention.

Referring to FIGS. 9 to 14 there is illustrated another starter pack of the invention together with an ancillary charging system (FIG. 12) and user battery connection system (FIG. 11). The unit incorporates a switching system to avoid accidental switching of the unit into a 24 volt setting while it is connected to equipment not designed to take 24 volt current and thus damaging the equipment. In these diagrams the numerals represent the following components.

51. A mild steel casing fabricated and welded, front panel 1.5 mm, side and back panels 2 mm finished in a powder coating.
52. 10 amp thermal trip fuse (circuit breaker) used in the charging circuit which trips out if the unit is switched to 24 volt during the charging process.
53. Momentary push button switch used to activate the battery condition indicator.
54. Main transfer switch 12 volt–(off)–24 volt. The switch handle 83 may be turned anti-clockwise from the off position to the 12 volt position, which will give 12 volts dc at power connector 58. To attain 24 volt power at power connector 58 the switch handle 83 must be pulled out towards the operator and then turned clockwise from the off position to the 24 volt position.
55. 10 amp thermal trip fuse (circuit breaker) used in the charging circuit.
56. Battery condition indicator, which, when push button 53 is depressed gives a reading of the state of charge contained in the batteries.
57. A 4-pin socket used to individually charge both batteries by means of a 220 volt ac automatic charger 61 which is connected to the unit by means of a 4-pin plug and cord 62.
58. Snap connector which is used in conjunction with booster cable 65.
59. Stick on label.
60. 2 mm mild steel powder coated back panel which is fitted with a bracket 69 to secure the batteries 70 and 71.
61. 220 volt ac automatic charger.
62. 4-pin charging plug and cord.
63. 200 amp red positive alligator clamp.
64. 200 amp black negative alligator clamp.
65. 35 mm² twinflex red and black booster cable 2 m long, fitted with a snap-connector at one end and 200 amp pos-neg alligator clamps at the other end.
66. Power connector (snap-connector).
67. Safety light which is fitted to the snap-connector 66. The safety light provides an anti hook-up warning by means of a red light for wrong hook-up and a green light for correct hook-up.
68. Stick on instruction label fitted to back panel 60.
69. Bracket for securing batteries which is spot welded to back panel 60.
70. 12 volt 16 Ah sealed lead acid battery.
71. 12 volt 16 Ah sealed lead acid battery.
72. 35 mm² flexible cable used in the 12 volt–(off)–24 volt transfer system
73. 5 Amp fuse in auto holder.
74. 1.5 mm² cable used in charging system.
75. Positive battery terminal.
76. Positive battery terminal.
77. Negative battery terminal.
78. Negative battery terminal.
79. Female cigar socket.
80. Male cigar plug.
81. 220 v ac plug top.
82. Handle for lifting unit.
83. Switch handle.

A switching mechanism is used whereby the switch handle 83 must be pulled out towards the operator before being turned clockwise to the 24 volt setting, thus avoiding accidental turning of the switch handle directly into the 24 volt setting. The switch handle 83 is turned anti-clockwise back to the off setting.

If the 12 volt setting is required, the switch handle 83 is turned anti-clockwise from the off setting to the 12 volt setting.

This system protects the user from making an error and also prevents the user from damaging the unit or the equipment being energised.

In more detail, the charging plug 62 is wired so as to charge both 12 volt batteries individually and at the same time. This is a 12–24 volt system, if the transfer switch 54 is turned to the 24 volt position during the charging process it would result in damage to the unit's internal wiring and the charger. To avoid such damage thermal trip fuses 52 and 55 are provided. In addition, the wiring circuit is arranged so that if the unit is being charged by means of the charging plug 62 in conjunction with ac 12 volt charger 61 and the operator ignores the warning instructions and still pulls and turns the transfer switch 54 by means of the switch handle 83 clockwise into the 24 volt setting thus causing a direct short across the loops in the charging plug 62, both thermal trip fuses 52 and 55 trip immediately, thus protecting both the internal charging circuitry and the charging system.

When the transfer switch 83 is moved to the 24 volt setting it connects negative battery pole 77 with positive battery pole 76, thus aligning the batteries in series giving 24 volts dc at snap connector 58. If the transfer switch 54 is in the 24 volt setting and the charging plug 62 is plugged into the unit the loops in the charging plug 62 will cause direct shorts. across the positive charging wire coming from battery pole 76 and the negative charging wire 77 causing both thermal trip fuses 52 and 55 to trip out due to the internal loops linking the poles in charging plug 62.

The invention is not limited to the embodiments hereinbefore described which may be varied in detail.

What is claimed is:

1. A portable engine starter pack comprising a housing having a base, a top, a rear wall, a front wall and a pair of sides;

a battery located in the housing, the battery having a positive terminal and a negative terminal;

a socket extending from the housing, the socket having a positive socket portion connected to the positive terminal of the battery, and a negative socket portion connected to the negative terminal of the battery;

switch and/or indicating means extending from the front panel or the rear panel;

the housing having forwardly and/or rearwardly extending projections which extend proud of the panel carrying the switch and/or the indicating means to substantially protect the switch and/or the indicting means against damage if the housing is tipped into a position in which the panel carrying the switch and/or the indicating means is lowermost.

2. A starter pack as claimed in claim 1 wherein the sides are extended to define the forward and/or rearward projections.

3. A starter pack as claimed in claim 1 wherein the housing includes an integral top handle.

4. A starter pack as claimed in claim 1 wherein the switch is a switch for switching between different supply voltages.

5. A starter pack as claimed in claim 4 including means for inhibiting connection to an incorrect voltage supply.

6. A starter pack as claimed in claim 5 wherein the inhibiting means comprises the switch.

7. A starter pack as claimed in claim 6 wherein the switch has an operating handle which is movable between an off position and at least two different supply voltage positions.

8. A starter pack as claimed in claim 7 wherein the operating handle requires different movements in configurations for different voltage settings.

9. A pack as claimed in claim 8 wherein the operating handle requires at least a two step movement to move to one of the supply voltage settings.

10. A pack as claimed in claim 9 wherein the push or pull movement is followed by a rotational movement.

11. A starter pack as claimed in claim 1 wherein the indicating means is a battery condition indicator.

12. A starter pack as claimed in claim 1 wherein the pack comprises a charging socket for charging the battery in the housing.

13. A starter pack as claimed in any claim 1 comprising a warning indicator for indicating if a user has incorrectly connected to a battery to be charged.

14. A starter pack as claimed in claim 13 wherein the indicator is a visual and/or an audible alarm.

15. A portable engine starter pack comprising a housing having a base, a top, a rear wall, a front wall and a pair of sides;

a battery located in the housing, the battery having a positive terminal and a negative terminal;

a socket having a positive socket portion connected to the positive terminal of the battery, and a negative socket portion connected to the negative terminal of the battery;

the pack having at least two different supply voltages;

a switch for switching between the supply voltages; and means for inhibiting connection to an incorrect voltage.

16. A pack as claimed in claim 15 wherein the means for inhibiting connection to an incorrect voltage comprises the switch.

17. A pack as claimed in claim 16 wherein the switch has an operating handle which is movable between an off position and at least two different supply voltage positions.

18. A starter pack as claimed in claim 17 wherein the operating handle requires different movements in configurations for different voltage settings.

19. A pack as claimed in claim 18 wherein the operating handle requires at least a two step movement to move to one of the supply voltage settings.

20. A pack as claimed in claim 19 wherein a push or pull movement is followed by a rotational movement.

21. A starter pack as claimed in claim 15 wherein the indicating means is a battery condition indicator.

22. A starter pack as claimed in claim 15 wherein the pack includes a charging socket for charging the battery in the housing.

23. A starter pack as claimed in claim 15 comprising a warning indicator for indicating if a user has incorrectly connected to a battery to be charged.

24. A starter pack as claimed in claim 23 wherein the indicator is a visual and/or an audible alarm.

* * * * *